United States Patent
Pudipeddi et al.

(10) Patent No.: US 11,226,859 B2
(45) Date of Patent: Jan. 18, 2022

(54) SYSTEMS AND METHODS FOR ERROR RECOVERY

(71) Applicant: Microsoft Technology Licensing, LLC, Redmond, WA (US)

(72) Inventors: Bharadwaj Pudipeddi, San Jose, CA (US); Maral Mesmakhosroshahi, Sunnyvale, CA (US); Jinwen Xi, Sunnyvale, CA (US); Saurabh M. Kulkarni, Redmond, WA (US); Marc Tremblay, Bellevue, WA (US); Matthias Baenninger, Seattle, WA (US); Nuno Claudino Pereira Lopes, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/833,191

(22) Filed: Mar. 27, 2020

(65) Prior Publication Data
US 2021/0232451 A1 Jul. 29, 2021

Related U.S. Application Data

(60) Provisional application No. 62/966,019, filed on Jan. 26, 2020.

(51) Int. Cl.
*G06F 11/07* (2006.01)

(52) U.S. Cl.
CPC ...... *G06F 11/0793* (2013.01); *G06F 11/0724* (2013.01); *G06F 11/0751* (2013.01)

(58) Field of Classification Search
CPC ............ G06F 11/0724; G06F 11/0751; G06F 11/0793
See application file for complete search history.

(56) References Cited

U.S. PATENT DOCUMENTS

| | | | |
|---|---|---|---|
| 2013/0290223 A1* | 10/2013 | Chapelle | G06N 20/00 706/12 |
| 2017/0220949 A1* | 8/2017 | Feng | G06N 20/00 |
| 2018/0239658 A1* | 8/2018 | Whitner | G06F 11/0751 |
| 2018/0253646 A1* | 9/2018 | Feng | G06N 3/0454 |
| 2019/0205745 A1* | 7/2019 | Sridharan | G06F 9/5077 |

OTHER PUBLICATIONS

"International Search Report & Written Opinion issued in PCT Application No. PCT/US2020/065417", dated Apr. 12, 2021, 24 Pages.

* cited by examiner

*Primary Examiner* — Joseph R Kudirka

(57) ABSTRACT

Embodiments of the present disclosure include an error recovery method comprising detecting a computing error, restarting a first artificial intelligence processor of a plurality of artificial intelligence processors processing a data set, and loading a model in the artificial intelligence processor, wherein the model corresponds to a same model processed by the plurality of artificial intelligence processors during a previous processing iteration by the plurality of artificial intelligence processors on data from the data set.

20 Claims, 9 Drawing Sheets

SYSTEMS AND METHODS FOR ERROR RECOVERY

CROSS-REFERENCES TO RELATED APPLICATIONS

The present application claims the benefit and priority of U.S. Provisional Application No. 62/966,019, filed Jan. 26, 2020, entitled "SYSTEMS AND METHODS FOR ERROR RECOVERY." The entire contents of this provisional application are incorporated herein by reference for all purposes.

BACKGROUND

The present disclosure relates to a computing. More particularly, the present disclosure relates to techniques for error recovery in artificial intelligence processing.

Artificial intelligence (AI) processing typically includes loading some or all of an AI model (e.g., a neural network model) onto one or more processors. A data set is applied to inputs of the AI model and outputs are generated. For inference, the outputs may correspond to classification or recognition of a particular feature of the input data set. For training, the outputs are compared against known outputs for the input data and an error is backpropagated through the model and parameters of the model are adjusted. For large models and data sets, processing may be divided across multiple processors to obtain results faster.

One problem with such systems is when one node of a multiprocessor system experiences an error. In many cases, restarting computations may require having to recompute large amounts of data.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Artificial intelligence (AI) processing systems are often required to process large amounts of data. Distributed processing increases processing speed. For example, distributed training in deep learning using synchronous or hybrid data parallelism is an effective method to converge models across many AI processors with high throughput and accuracy.

One example technique used in AI networks (e.g., for training) is referred to as data parallelism. Data parallelism breaks up the training dataset into pieces, and AI processors are loaded with models to process the data in parallel. For example, in one embodiment of data parallelism, training data may be divided into pieces (aka, shards), and each shard may be distributed for processing across a plurality of AI processors (aka workers or target processors). The shards in turn are divided into minibatches, which are iteratively processed by the plurality of AI processors on successive iterations. During each iteration, the AI processors receive a minibatch (e.g., of training data) and determine changes in model parameters (aka, "gradients" or "deltas"). At the end of each iteration, the AI processors may combine and synchronize their model parameters, and the model is updated with new parameter values.

Figure 1:
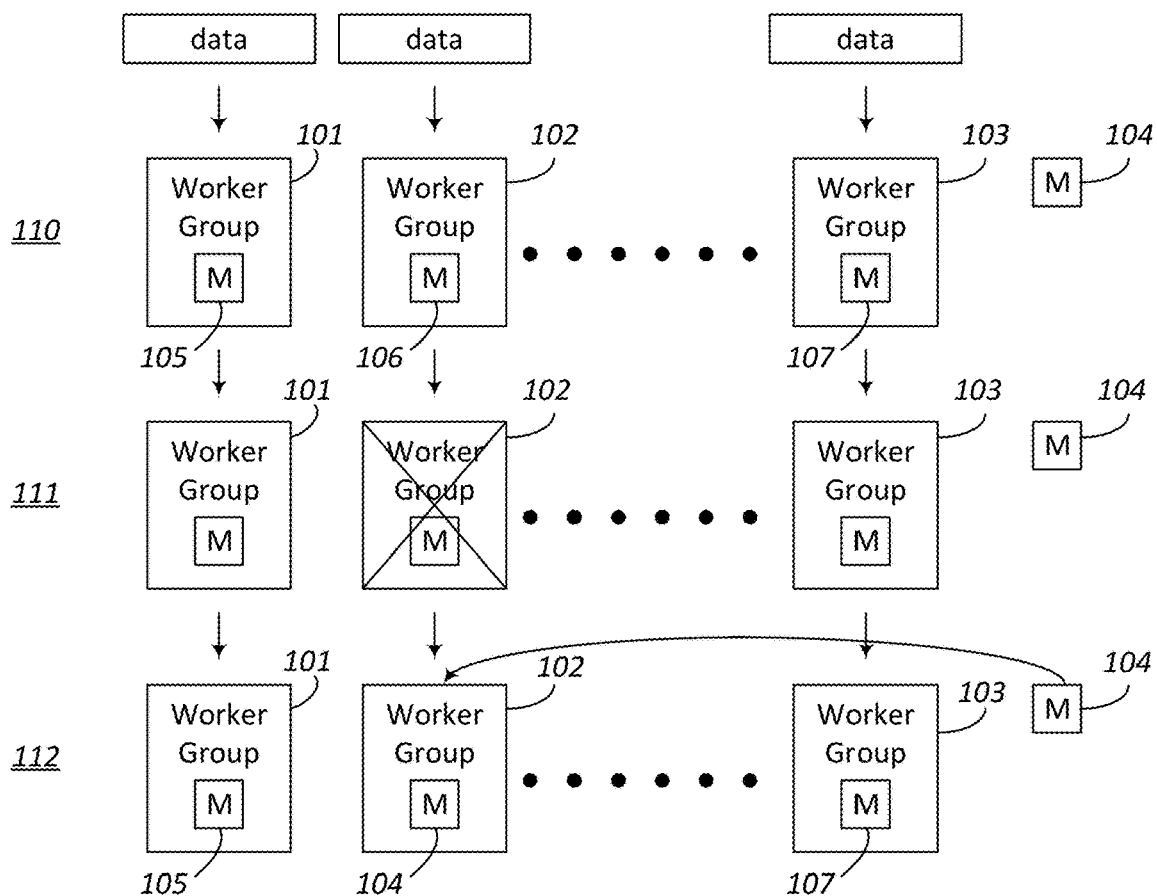
FIG. 1 illustrates error recovery in a multi-processor computing environment according to an embodiment.

Features and advantages of the present disclosure include a process for recovering from failures. FIG. 1 illustrates a plurality of AI processors configured to process data using a model M in parallel. In this example, AI processors are configured in a plurality of N worker groups 101-103, where N is an integer. A worker group may include one or more AI processors, for example. AI processors may include graphics processors (GPUs), AI accelerators, or other digital processors optimized for AI operations (e.g., matrix multiplications versus Von Neuman Architecture processors such as the x86 processor). Example AI processors may include GPUs (e.g., NVidia Volta® with 800 cores and 64 MultiAccumulators) or a Tensor Processor Unit (TPU) (e.g., 4 cores with 16 k operations in parallel), for example.

This example illustrates an iteration where each worker group receives input data (e.g., a minibatch) and processes the data using models 105-107. In this example, an iteration begins at 110, where each worker group starts with substantially the same model. For example, as part of a previous iteration, the models 105-107 in each of the worker groups may have synchronized their parameters (e.g. by performing an All-Reduce). In one embodiment, one or more copies of the model may be saved as model 104 between each iteration cycle, for example. At 111, each worker group processes different input data, such as a minibatch from the same training data set, for example. However, in this example, one of the worker groups 102 experiences an error (e.g., a hardware failure or a software failure). Advantageously, at 112, saved model 104 used at the beginning of the iteration may be loaded into worker group 102 and worker group 102 may quickly restart processing to produce a result. At 112, the results of all the worker groups 101-103 may be combined to produce an updated model, and the resulting model may be saved again for the next iteration, for example. In various embodiments described in more detail below, a worker group experiencing an error may receive a new model 104 from a controller (shown below), another worker group, or from a memory local to the worker group, for example.

Figure 2:
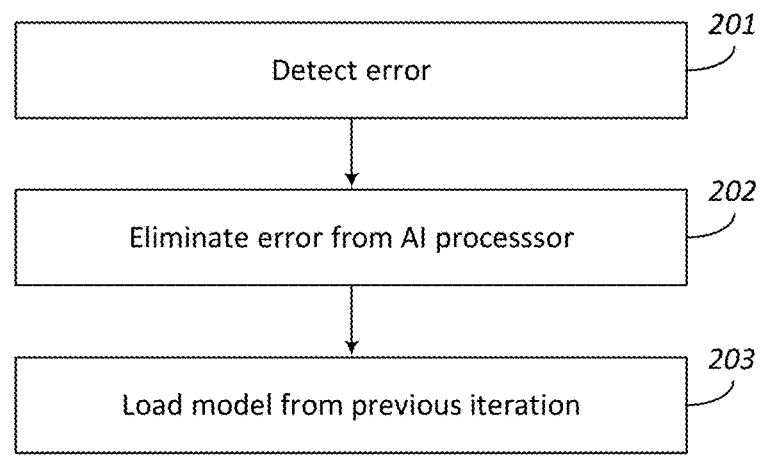
FIG. 2 illustrates a method of recovering from a processor error in a multi-processor computing environment according to an embodiment.

FIG. 2 illustrates an error recovery method according to an embodiment. At 201, a computing error is detected. For example, the computing error may be a software error or a hardware error in an AI processor of a plurality of artificial intelligence processors processing a data set. At 202, the AI processor may eliminate the error. For example, in some embodiments, some or all elements of the AI processor (e.g., hardware or software components) may be restarted. As illustrated in various example embodiments below, an AI processor may be restarted by a controller coupled to the AI processor, for example. At 203, a model is loaded in the AI processor, wherein the model corresponds to a same model processed by the plurality of AI processors during a previous processing iteration by the plurality of AI processors on data from the data set.

Features and advantages of the present disclosure include a worker group being able to access a model used at the beginning of each iteration of processing to restart quickly. Traditionally, AI systems would go through many iterations before reaching a global check point, where state information for the system was saved. Errors required some systems to return across many iterations to the global check point, which was time consuming. Advantageously, an AI processor experiencing a failure may return to the beginning of the current iteration, while the other processors may wait when they are finished generating the current iteration results. Once the failed AI processor is reset and the error is cleared, it can reload the current iteration model and resume. As described herein models may be stored in a number of different locations that may be accessible to an AI processor experiencing an error condition. Example AI models are combinations of AI parameters, such as weights or biases, for a particular AI topology. Processing the models may include generating gradients during each iteration. Gradients may include deviations (deltas) from current parameter values (e.g., a delta value for a particular weight of a neural network). Gradients are produced as processing results by each AI processor, and may be combined (e.g., aggregated via an average, mean, etc. . . . ) and then applied to the values of the model at the beginning of the iteration. For example, an average delta for all weights in a neural network model may be calculated and the average delta is applied to produce the subsequent model used for the next iteration.

Figure 3:
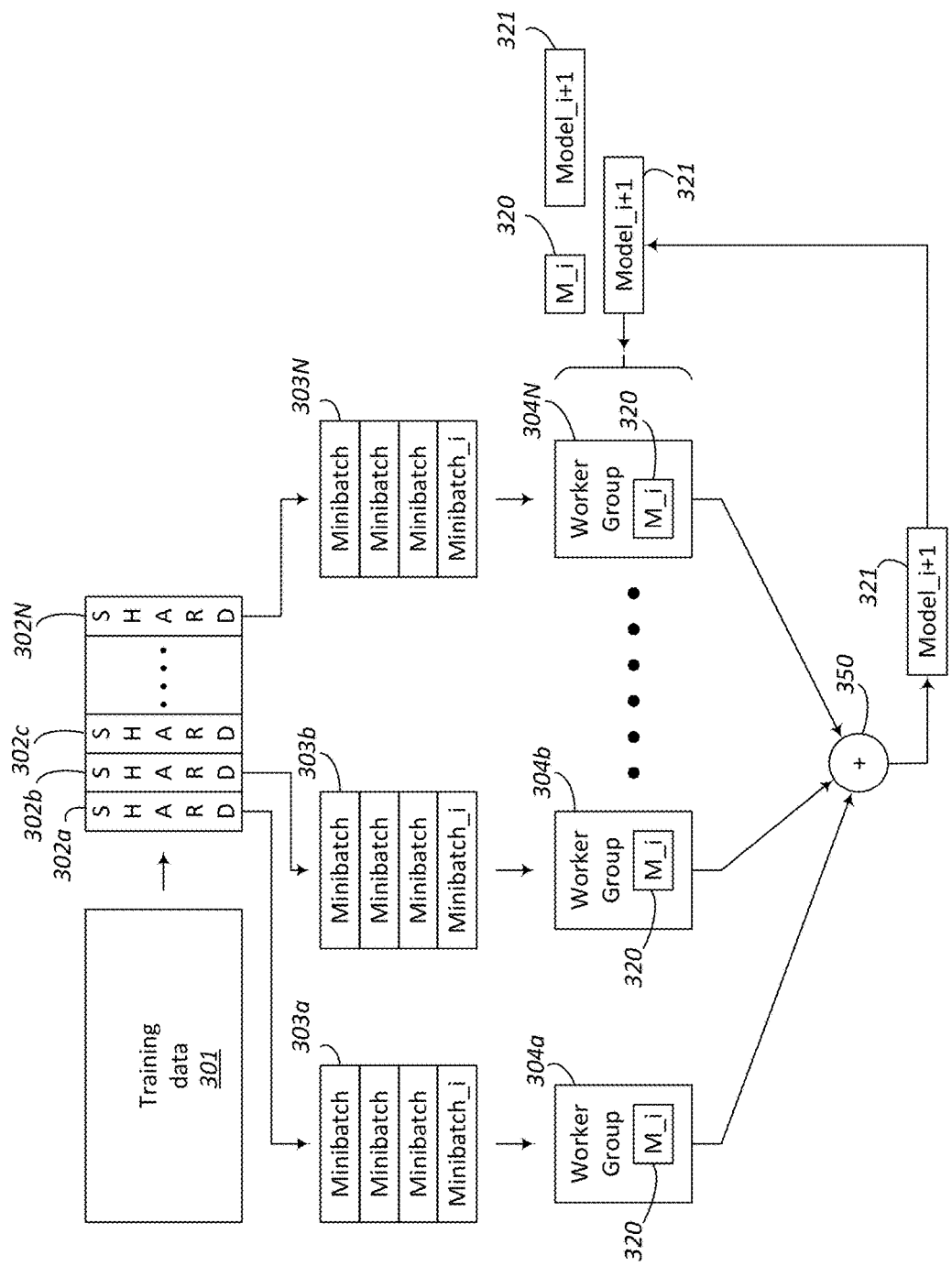
FIG. 3 illustrates reloading a model during training in a multi-processor computing environment according to an embodiment.

FIG. 3 illustrates error recovery in computer processing system performing training according to one example embodiment. In this example, training data 301 is used to train parameters of an AI model, such as weights of a neural network. Training data set 301 may be divided into pieces (referred to herein as slices or "shards") 302a-N. The shards, in turn are forwarded to different worker groups for processing. Each of the shards may be divided into smaller pieces 303a-N (referred to herein as "minibatches" or sometimes just "batches"). The minibatches 303a-N of each shard are sequentially coupled to worker groups 304a-N one at a time. A worker group may receive a minibatch of training data and perform AI training on a model 320 and produce a training result. The training results from each worker group may then be combined at 350 to produce an updated model 321, which may be loaded into each worker group for processing the next minibatch, for example. As used herein, an "epoch" occurs when every worker group processes all their shards and one full training data set 301 has been processed once. The training data set 301 may be processed over multiple epochs to arrive at a final trained set of model parameters, for example. It is to be understood that other ways of partitioning and processing data set 301 across multiple worker groups may use the error recovery techniques described herein.

In this example, an iteration includes receiving minibatches by worker groups 304a-N, processing the minibatches to produce results, and combining the results to produce an updated model. An iteration further includes loading the updated model into the worker groups (e.g., at the beginning or end of an iteration). FIG. 3 illustrates an ith iteration where N ith minibatches (minibatch_i) are loaded into N worker groups 304a-N for processing (e.g., where N is an integer). An ith model, M_i 320, generated on a previous, (i−1)th, iteration is loaded into each worker group 304a-N. Results from processing each minibatch_i are combined at 350 to produce a subsequent (or next) model, model i+1 321, which is then loaded into each of the worker groups 304a-N for processing the i+1$^{st}$ minibatches on the following i+1$^{st}$ iteration. As mentioned above, the model for each iteration may be available for each of the worker groups to access should one of the worker groups experience an error (e.g., a hard or soft failure). Accordingly, if worker group 304b, for example, fails during processing minibatch_i, it may reload the ith model (M_i) and complete its processing. The other systems may detect that worker group 304b is experiencing an error and wait. When worker group 304b clears the error produces a result, the results from the worker groups are combined and computing continues.

Figure 4:
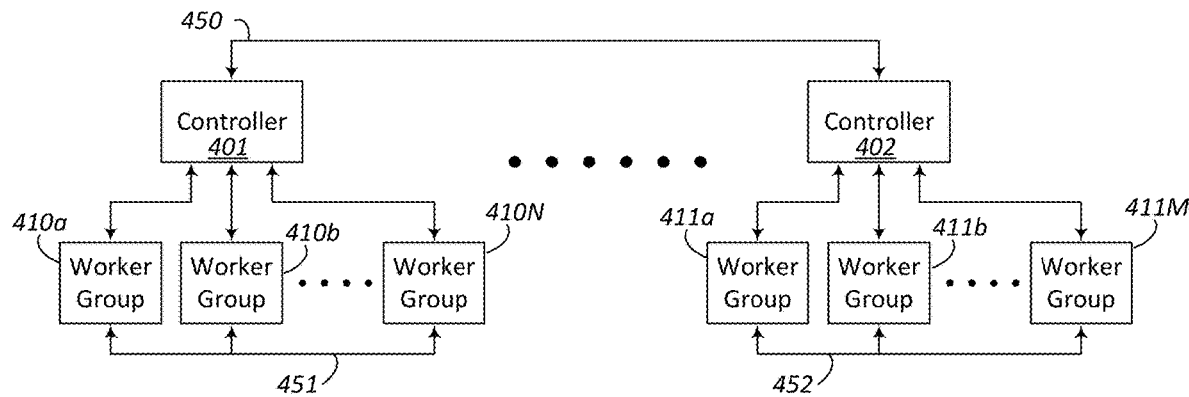
FIG. 4 illustrates a multi-processor computing architecture according to an embodiment.

FIG. 4 illustrates a compute architecture for processing AI data. In this example, a plurality of worker groups are coupled to a controller, and the controllers may be coupled to a network. For example, worker groups 410a-N are coupled to controller 401 and worker groups 411a-N are coupled to controller 402. Controllers 401 and 402 may be coupled together over network 450 (e.g., via an Ethernet connection and one or more network switches—not shown). Worker groups may also be coupled together over a communications link (e.g., PCIe), such as links 451 and 452. A plurality of such controllers/worker groups may be used to process AI data in parallel as described above for training data, for example. In various embodiments, the combining of processing results described above (e.g., delta_parameters) may be performed by the controllers, between the worker groups (e.g., via an all reduce), or using combinations thereof, for example.

As mentioned above, each worker group may include one or more workers, and each worker may be one or a plurality of GPUs, TPUs, or another AI processor optimized for performing multiplication and addition (multiply-accumulate, "MACs"), matrix multiplication ("MatMul"), and other operations, for example. Controllers are sometimes referred to as Hosts or Gateways. Controllers may be traditional CPUs, FPGAs, systems on a chip (SoC), application specific integrated circuits (ASICs), or embedded ARM controllers, for example, or other processors that can run software and communicate with the worker groups based on instructions in the software. The system may include drivers that allow software to organize and control tasks that need to be performed on the target devices.

Figure 5:
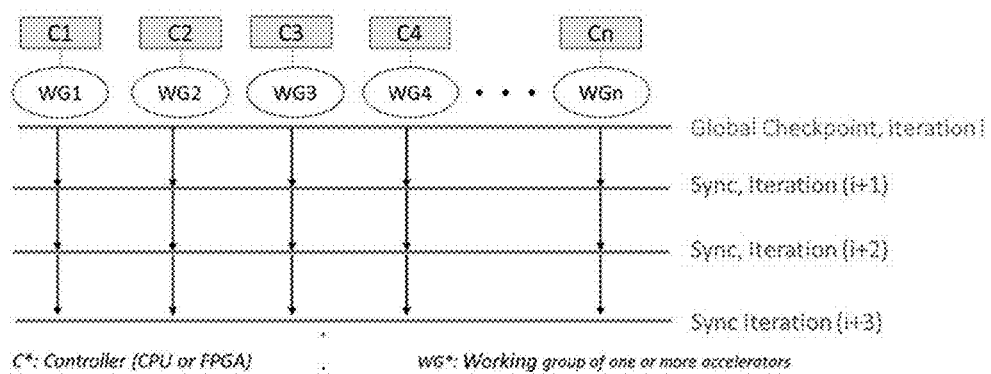
FIG. 5 illustrates synchronizing during each iteration and a global checkpoint according to various embodiments.
Figure 6:
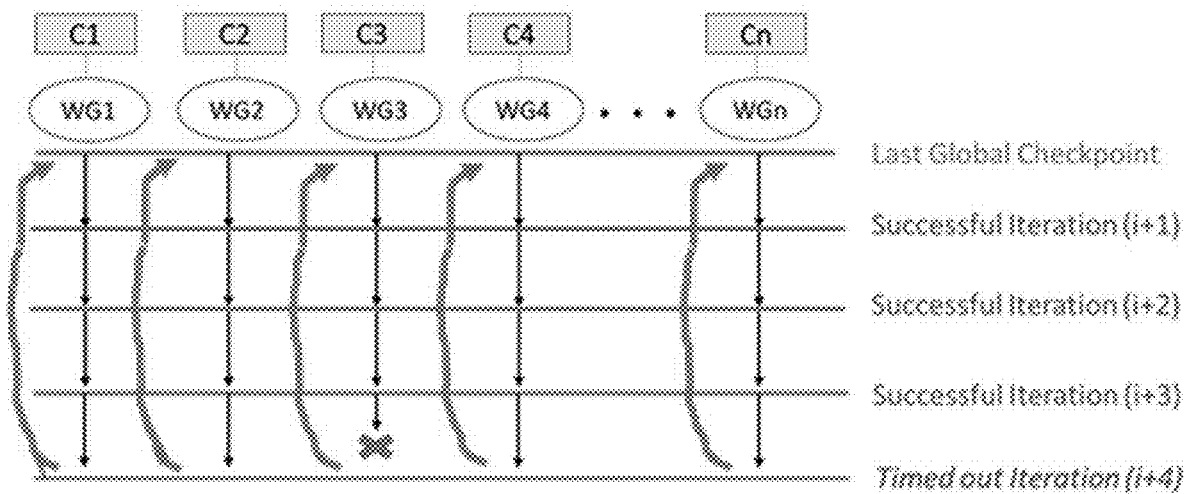
FIG. 6 illustrates returning to a global checkpoint according to various embodiments.

A high-level representation of a typical synchronous data parallelism flow is shown in FIG. 5. In this example, every iteration ends with a synchronization of the models across the worker groups (WG). Traditionally, a global checkpoint is taken periodically to recover from any errors or failures in the worker group. Frequent checkpoints according to some previous systems may have severely slowed down throughput, so the global checkpoints were often spread out (e.g., once an hour). One potential problem, however, is that recovery from such an error is also slow as shown in FIG. 6. Due to the failure shown in FIG. 6, all worker groups are interrupted and snapped back to the global checkpoint. If the errors or failures are frequent enough (such as poisoning in large-scale cluster), then this could have a severe impact on performance.

Figure 7:
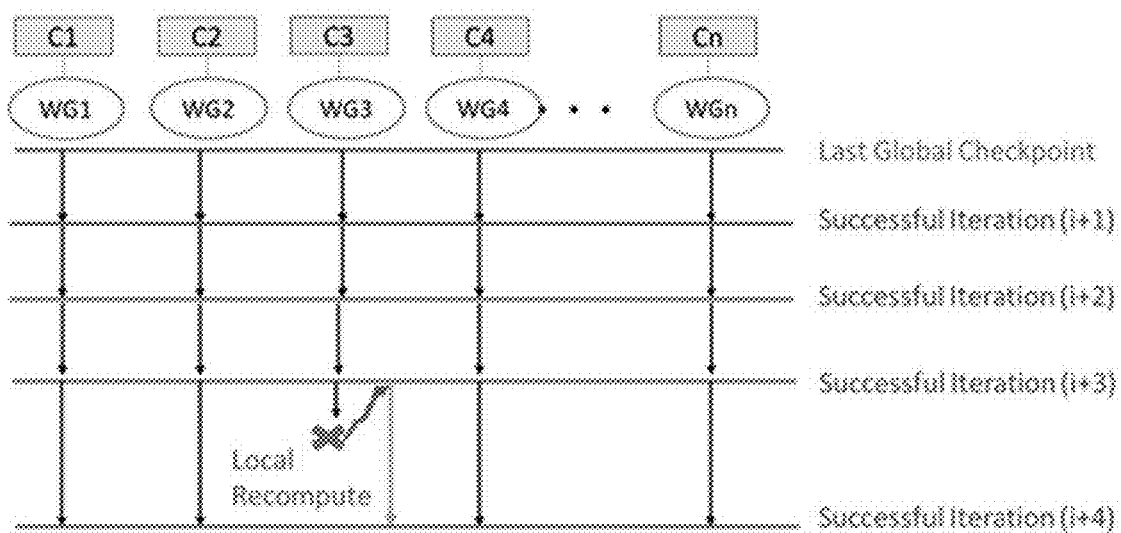
FIG. 7 illustrates reloading a model from a previous iteration according to various embodiments.

Features and advantages of the present disclosure recover errors and certain failures occurring within a large cluster by accessing a model from a previous iteration for a much faster recovery (e.g., within seconds as opposed to hours) without having to snap back the whole group to a global checkpoint. As illustrated in FIG. 7 and as described above, an error occurring in one or more worker groups may be resolved during a current iteration, where a local recompute is performed based on the model used at the start of the iteration. Accordingly, the worker group experiencing the error may recover quickly and all the worker groups may proceed to subsequent iterations without having to reprocess data from multiple previous iterations, for example.

Example embodiments of the present disclosure may leverage the observation that a state (e.g., a model) can be recomputed from the previous state as long as there is a fast and redundant copy accessible for recovery. Accordingly, in one embodiment, a "master copy" of a current model (e.g., parameters such as neural network weights used at the beginning of the iteration by the worker groups) may be stored in a location accessible by each worker group (e.g., on the controller). Note that the master copy may only need to be the minimum state information needed to recompute and so the copy of the model from the current iteration may not have some recomputable state information (e.g., activations for instance). Alternatively, the master copy may also reside directly on the worker groups (e.g., in an error correction code (ECC) protected local memory) for a particular worker group to access locally if the worker group experiences an error. In yet other embodiments, each worker group maintains an extra copy of the model for a current iteration that is not updated during processing so it is available to other worker groups that may experience an error condition. Advantageously, if a model for a current iteration is maintained by each worker group, different portions (different subsets of the entire model) of the model may be sent by multiple different worker groups to the failed worker group at the same time, which may, in some architectures, be much faster than sending the model from the controller to the failed worker group, for example.

In one embodiment, a redundant copy of the model may be spread across worker groups so that each worker group gets two different sections of the two copies (e.g., if it carries the same section of the two copies, then a failure in the worker group will have irrecoverable loss). The master copy may be updated frequently at the end of every iteration. It also may be updated more frequently in certain forms of data parallelism which allows local updates. Finally, in some example embodiments, the controller may be notified on any unrecoverable error by a worker in the worker group (such as a parity error) or if a local timeout is setup, which may be much smaller than the global timeout minus the estimated recovery time, but it is large enough to recognize errors, for example. Alternative to timeouts, the workers may send heartbeats to the controllers so the controller can determine when a worker has experienced an error.

In various embodiments, the method of recovery may depend upon the failure cases. For parity errors (poisoning): the controller may reset the worker group to rerun from the master copy of the model again with the same minibatch data. For local timeouts (or heartbeat misses) the controller may force the failing worker to reset (e.g., via a sideband operation). If this succeeds, the recovery proceeds as in the case of a parity error or poisoning above. If it does not succeed after repeated attempts, then the controller may recompile a less efficient model on the same worker group or may employ a dedicated spare worker group, for example. If none of these options work or available, the controller may fail itself.

For controller failures, all controllers may have an identical master copy of the model at the end of every iteration. Thus, a controller failure resulting in a global timeout may not have to revert back to the global checkpoint. A controller may continue from a current iteration point after software readjusts operable worker groups and data shards for new cluster size, for example.

In various embodiments, there may be multiple methods for recovery of a redundant copy from the end of the previous iteration. In one embodiment, a controller provides the copy from its own copy in memory. In another embodiment, the failing worker group may have a master copy in local memory (e.g., in direct-attached ECC-protected memory). In yet another embodiment, the failing worker group gathers a copy from one or more operable worker groups (e.g., in parallel).

Figure 8:
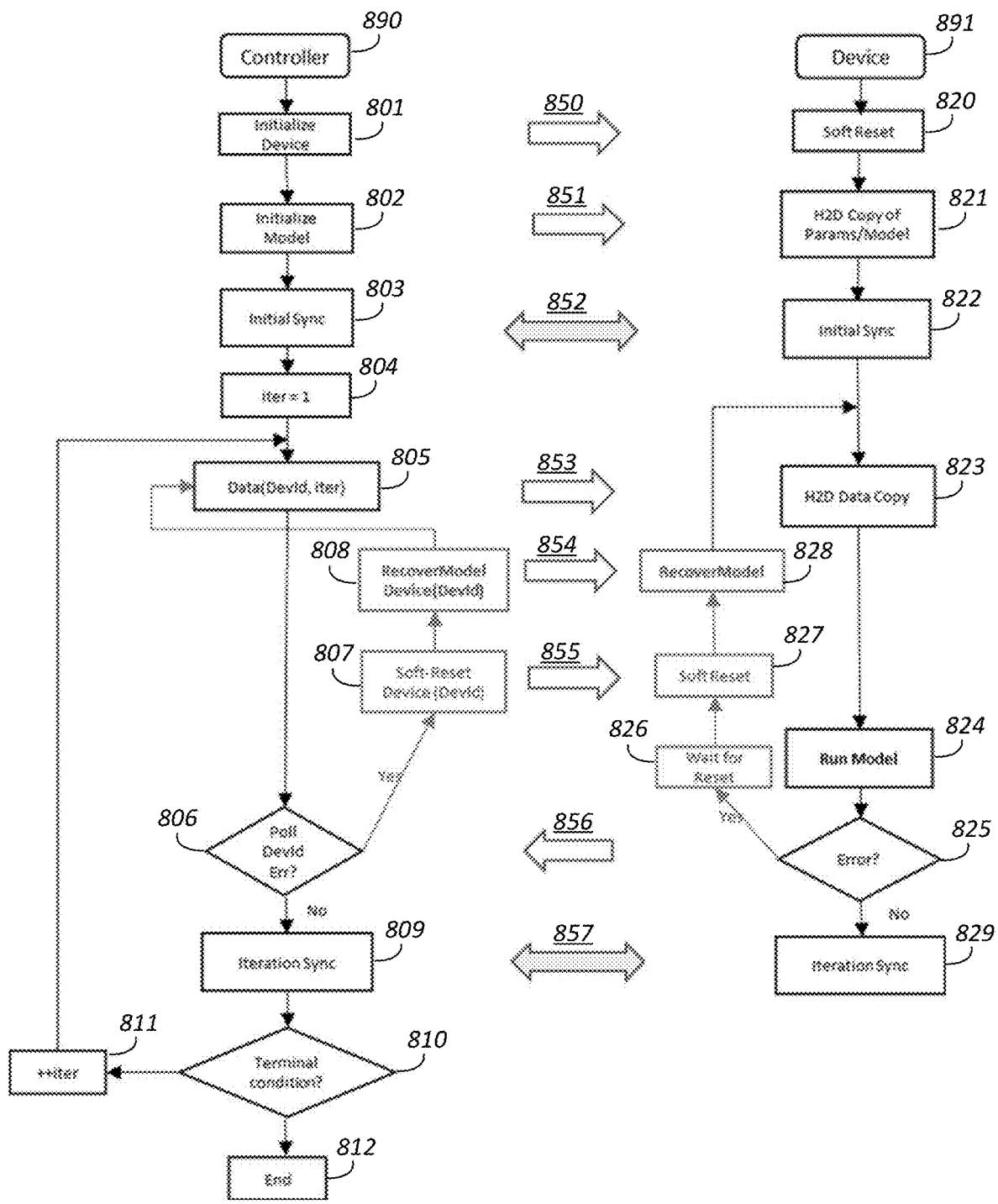
FIG. 8 illustrates controller and processing device operations according to one example embodiment.

FIG. 8 illustrates an example error recovery method where the controller side interacts with the target device in a worker group. Here the "device" 891 is a worker or a worker group (e.g., a group of devices sharing one copy of a model). In this example, only one device is shown to simplify the illustration, but the controller 890 may have a process for each device 891. Arrows 850-857 show the flow of data and/or control information between the controllers and artificial intelligence processors, for example. The example method illustrated in FIG. 8 shows a plurality of iterations. At 801, controller 890 may initialize devices 891. Accordingly, devices 891 may perform a soft reset at 820, for example. At 802, the model is initialized, and devices 891 may each receive a copy of the initial model. At 803 and 804, each controller 890 and associated devices 891 perform an initial synchronization. Iterations begin at 804, which illustrates the first iteration (e.g., iter=1). At 805, controller 890 causes a minibatch of data to be sent to each device 891 (e.g., DevId is the device identifier). Each device 891 receives the data at 823 and runs the data against the model at 824. At 825, device 891 may or may not detect an error. Likewise, controller 890 may poll devices for errors during processing. If no error is detected by the device at 825 or the controller at 806, the controller and device synchronize at 809 and 829, and controller 890 may initiate the next iteration, for example. However, if an error is detected by device 891 at 825, the device having the error may wait, at 826, for controller 890 to reset it. In this example, controller 890 may detect the device ID ("devID") of the device having an error at 806 and perform a soft reset of the device at 807. At 808, controller may send a copy of the model used during the current iteration to the device having the error. At 827, the device performs a soft reset, and at 828, the device receives and loads the model. The "RecoverModel" box may correspond to one of the aforementioned embodiments for recovery techniques, for example. The device may then reload the data at 823 and run the data against the reloaded model at 824. Other devices not experiencing an error may enter a wait state and resume after the device experiencing the error completes processing for the iteration. In some embodiments described herein, other devices may receive portions of the model and portions of the data, and loading and reprocessing of data for the device experiencing the error may be performed by multiple devices to reduce recovery time, for example.

Figure 9:
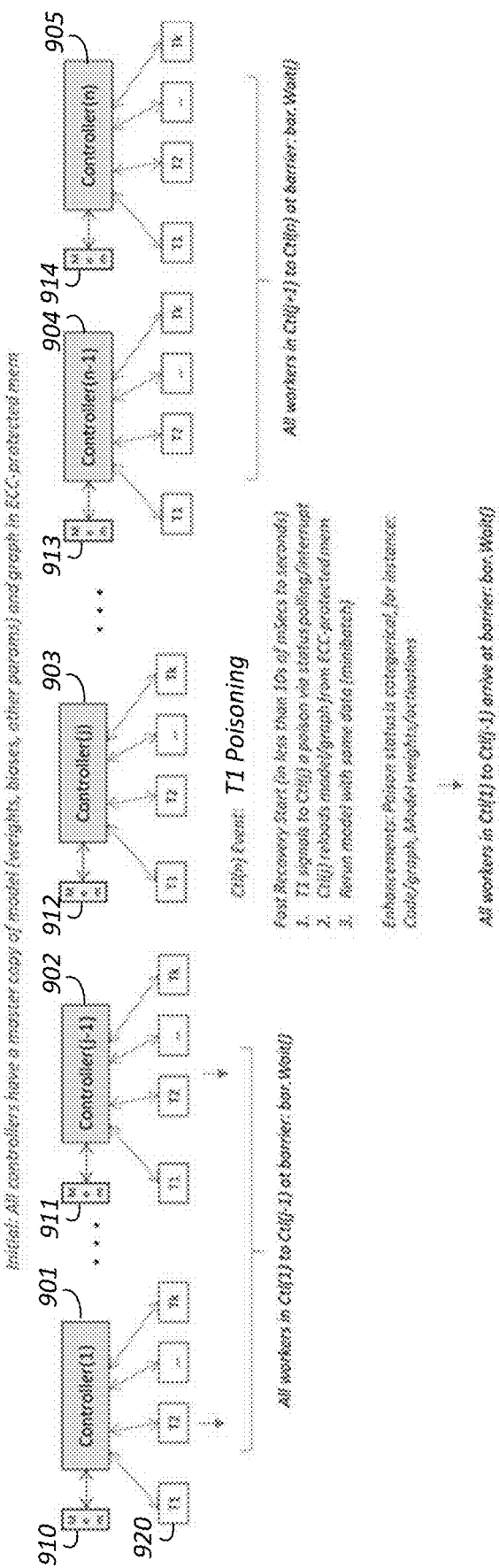
FIG. 9 illustrates an example architecture for error recovery according to another embodiment.

In one embodiment of the failure (controller-recovery) in FIG. 9, the controllers may have a master copy. In this example, "n" controllers 901-905 may be coupled to "k" worker groups (e.g., "k" groups of one or more artificial intelligence processors), and memories 911-914, respectively. The master copy of the model, on each iteration, may be stored in memories 911-914 coupled to the controllers 901-905, for example. The memories may be error correction code (ECC) protected to ensure the integrity of the saved models, for example. Recovery may be initiated by the controller detecting either a local timeout (or missed heartbeat) or a poisoning. In either case, the faulting worker is assumed to be revivable. If the worker is itself dead, then the controller could just signal an error that can only be fixed via going back to global checkpoint and readjusting the cluster. In another scenario where the faulting worker is dead, the controller can rebalance the same minibatch across the remaining workers (only if possible). The example case shown in FIG. 9 is fully recoverable though as the worker may only reports a detectable soft-error poisoning.

As mentioned above, in a second embodiment (self-recovery), an ECC-protected memory is attached to each worker. When the worker detects a poisoning, it will try to self-recover. It will retry the same minibatch by restarting and loading model/graph/data from the attached ECC memory. The poisoning can be further segmented by categories to make recovery faster. For instance, the worker specifies where the poisoning happened (by address-range) which then the recovery code uses to fix only that segment before restart. In the self-recovery case, a worker that soft-hangs may still be recoverable if the worker incorporates a watchdog timer interrupt (self-heartbeat) which is possible if there is one core dedicated for this purpose.

In a third embodiment (neighbor-recovery), a worker group with k workers (say, T1 to Tk) with or without a controller can recover even in the case of a hard failure by regrouping to a smaller group still operating on the same minibatch. To achieve this, the group may incorporate redundancy of the model. This is especially possible with model partitioning (model parallelism) where a worker group splits a model across multiple workers (e.g., different workers process different parts of the model). In this partitioning, a portion of each worker's memory carries a redundant copy of another worker's model state (e.g., just the minimum model state alone necessary for recovery) in a mutually exclusive way. For instance, whenever worker T1 is updating its segment, Seg(1), it also updates the redundant state in Worker Tk. This can be performed as a hardware assisted mirrored write, a software write, or during model update after an all-reduce, for example

TABLE 1

Redundancy in model partitioning across a group.

| Worker (aka Target) | Model State divided into k Segments in model parallelism | | | |
|---|---|---|---|---|
| | 1 | 2 | ... | k |
| Primary model state | Seg(1) | Seg(2) | ... | Seg(k) |
| Redundant model state | Seg(k) | Seg(k-1) | ... | Seg(1) |

Accordingly, in various embodiments, using redundant copy distribution, two or more copies can be distributed in mutually exclusive partitions (i.e. the same target does not hold identical segments of different copies) in such a way that any new (or restarted) target can gather an in-tact copy from the other members. Having two copies ensures one failure recovery, three copies for two failures, and so on. However, two copies may be used even for large clusters to recover from soft error or restarts.

Therefore, in various embodiments, recovery may be local using a master copy of a current iteration model that is stored in the controller, stored locally on the worker group, or, for multiple workers in a worker group, which may be exclusively partitioned across multiple workers on the same worker group (e.g., exclusively partitioned to the original copy so no worker has overlapping sections of the model).

Thus, a master copy may be partitioned mutually exclusively with the running copy across the same worker group when multiple workers are in a worker group. One example alternative is that two or more copies can be partitioned mutually exclusively across workers in such a way that any failure can be recovered by gathering one of the in-tact copies into the target that is restarted or a replacement target. In another embodiment, the copy could be a redundant copy from a specific target.

Figure 10:
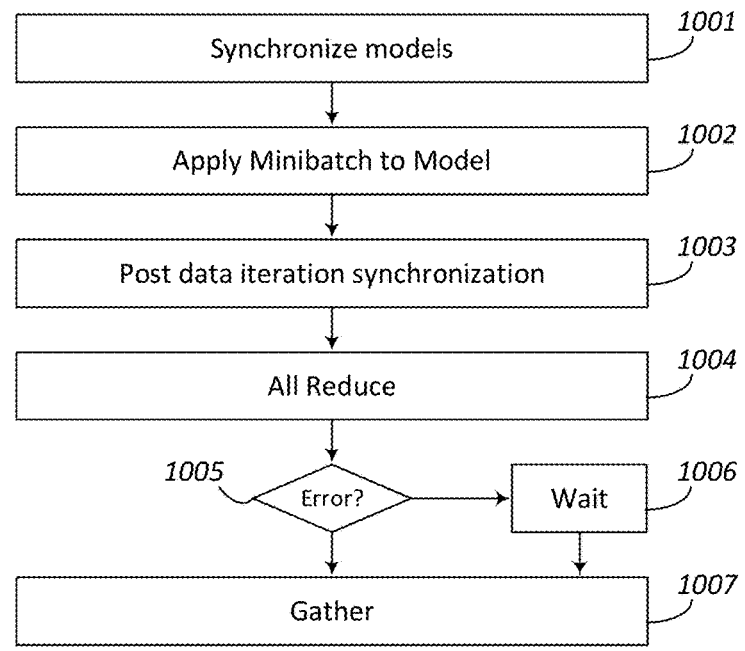
FIG. 10 illustrates recovery when an error occurs during a result aggregation phase according to one example embodiment.

FIG. 10 illustrates recovery when an error occurs during a result aggregation phase according to one example embodiment. In some embodiments, it may be advantageous to recover from errors that occur during a result aggregation phase of each iteration. For example, as illustrated in FIG. 10, an iteration may include synchronizing models across all the worker groups at 1001. At 1002, a minibatch is received and applied to the model to produce a result. A post data synchronization may occur at 1003, which is the beginning of the result aggregation phase. In some cases, an error in one of the artificial intelligence processors may occur after the data is applied to the model. Typically, each worker group may generate a unique vector of delta values (e.g., gradients) indicating changes in model parameters after each minibatch of data is processes, for example.

Figure 11:
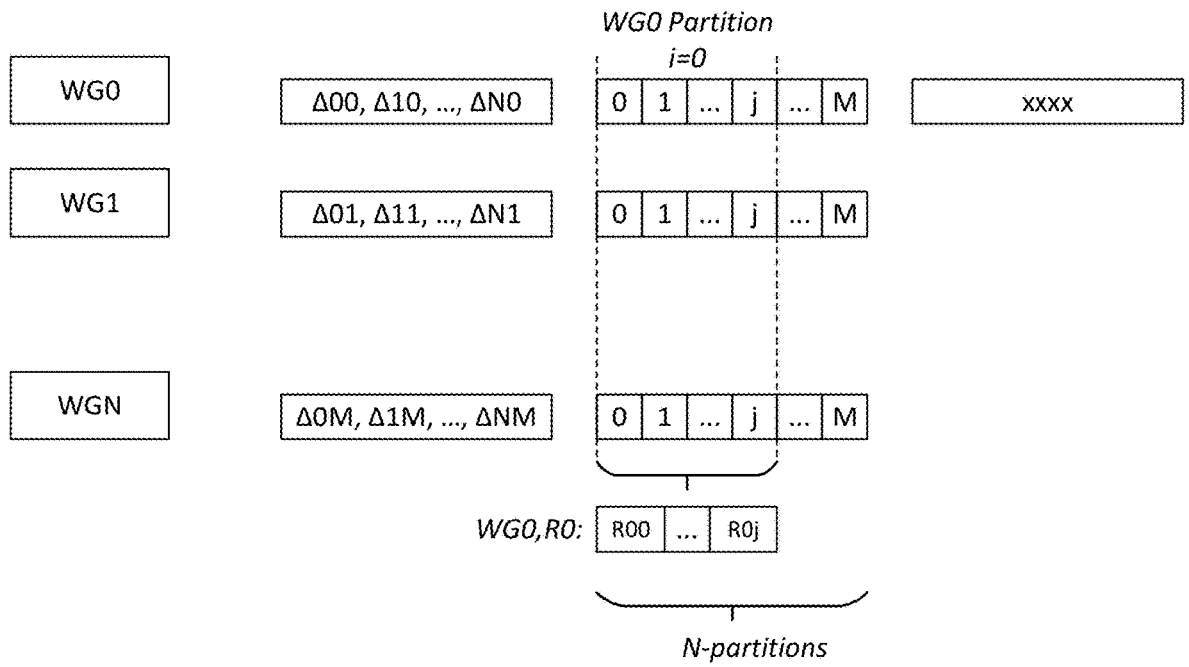
FIG. 11 illustrates example result generation according to an embodiment.

FIG. 11 illustrates example result generation according to an embodiment. Here, N worker groups WG0-WGN (N is an integer) produce N vectors of length M (e.g., where M is an integer equal to the number of neural network weights in a model). The delta values, $\Delta ij$, in each vector may be floating point numbers, for example. When the system is working (e.g., no errors), the vector produced by each worker group is passed to all the other worker groups, and each worker group aggregates one subset of fields from each vector. For N worker groups, there may be N partitions and each worker group aggregates the results for particular fields for vectors received from the other worker groups. For example, worker group WG0 may receive the vectors from the other worker groups and aggregate the Δ1j-Δij fields to produce result array R0, for example. Aggregation may include an average of the weights or other functions known by those skilled in the art of AI processing, for example. However, if one of the worker groups experiences an error during the processing of the results, the worker group may send an invalid result indicator to the other worker groups. In this example, WG0 sends an M length result vector that includes garbage bits (denoted here as "xxxx"). During processing of results, when another worker group receives the invalid result indicator from any of the other worker groups, it may trigger that worker group to enter a wait state. Accordingly, the worker groups may wait while the worker group experiencing the error eliminates the error and processes a valid result.

Figure 12:
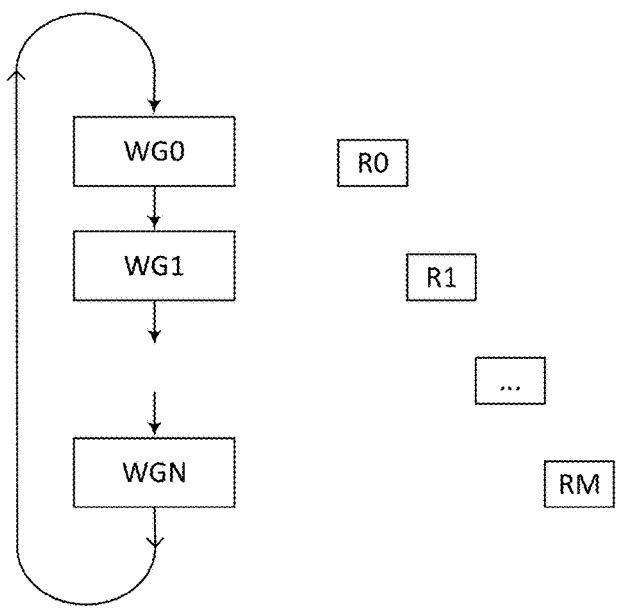
FIG. 12 illustrates an example of result aggregation according to an embodiment.

FIG. 12 illustrates an example of result aggregation according to an embodiment. In some embodiments, worker groups may be configured in a ring, where worker groups may pass vectors of gradients (described above) and then results (e.g., aggregated gradients) to other worker groups. In this example, each worker group may receive results arrays of aggregated gradients. When all the worker groups have all the results from all the other worker groups, each worker group will have a full set of aggregated results with which they can modify their version of the model. In this example, since all the worker groups started with the same model, each update of the model will result in the models remaining substantially the same (e.g., the AI parameters change together so each worker group has substantially the same model across all iterations). Again, if a worker group experiences an error, the worker group may output an invalid result indicator, and the other worker groups may wait until the worker group experiencing the error recovers and sends a valid result.

Figure 13:
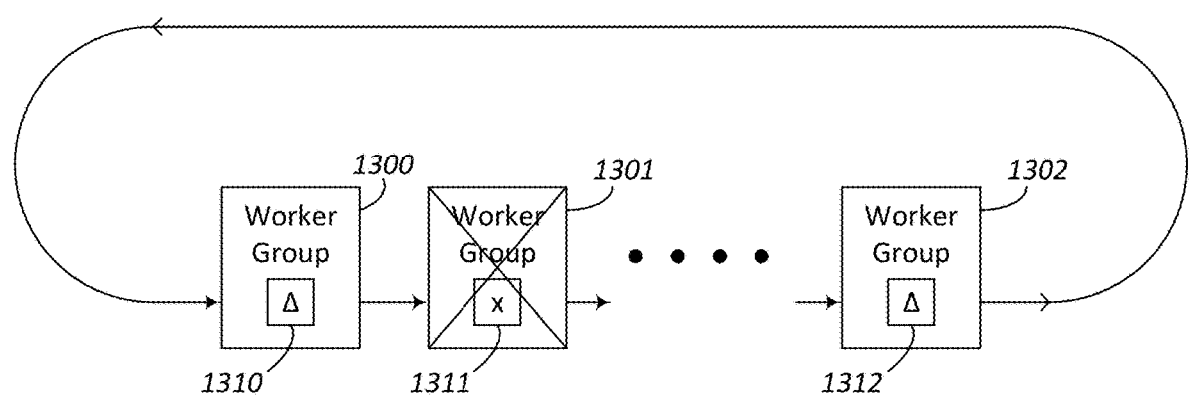
FIG. 13 illustrates error recovery in a multi-processor computing environment according to an embodiment.

FIG. 13 illustrates error recovery in a multi-processor computing environment according to an embodiment. In this example, worker group 1301 experiences an error and outputs an invalid result indicator, x, 1311. The other worker groups (e.g., 1300, 1302) may produce valid gradient vectors, A, (e.g., 1310, 1312). In this example, each of the other worker groups may wait until worker group 1301 has eliminated its error and generated a valid result. The system may then pass valid vectors of gradients, compute aggregated results, and forward the results to the other worker groups during the result aggregation phase so that each worker group has an updated model, for example.

Figure 14:
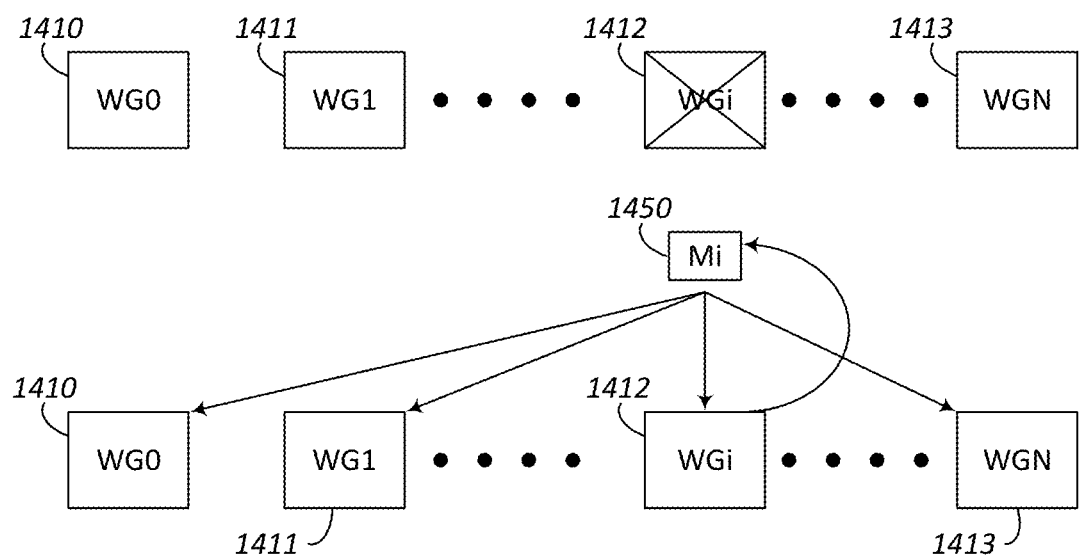
FIG. 14 illustrates distributing computations for a failed processor across multiple processors according to an embodiment.

FIG. 14 illustrates distributing computations for a failed processor across multiple processors according to an embodiment. In some embodiments, when a worker group detects and eliminates an error, different portions of the model may be loaded across worker groups including the worker group experiencing the error. Accordingly, the time to recompute results during a particular iteration for a worker group experiencing an error may be reduced. As illustrated in FIG. 14, worker groups 1410-1413 may be processing minibatches using the same model, for example. Here, worker group 1412 experiences an error. However, in this example, the model for the current iteration is partitioned across multiple worker groups, including worker group 1412. Referring to FIG. 14, when worker group 1412 has eliminated the error, worker group 1412 may trigger a load of model 1450 across worker groups 1410-1413. Accordingly, the portion of the training data intended for processing by worker group 1412 on the current iteration may be processed in multiple worker groups 1410-1413 to reduce the recovery time, for example.

FURTHER EXAMPLE EMBODIMENTS

In various embodiments, the present disclosure includes an error recovery method. The method may be embodied in non-transitory computer readable storage medium having stored thereon program code executable by a computer system, the program code causing the computer system to perform the techniques described herein. In some embodiments, the computer system may include a plurality of artificial intelligence processors and one or controllers. The non-transitory computer readable storage medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a method comprising: detecting a computing error in a first artificial intelligence processor of a plurality of artificial intelligence processors during a first processing iteration of data from a data set; eliminating the error from the first artificial intelligence processor; and loading a model in one or more of the artificial intelligence processors including the first artificial intelligence processor, wherein the model corresponds to a same model processed by the plurality of artificial intelligence processors during the first processing iteration of the data from the data set.

In one embodiment, the plurality of artificial intelligence processors other than the first artificial intelligence processor wait while the first artificial intelligence processor eliminates the error, and wherein the plurality of processors process data from the data set on a next processing iteration at the same time using a second same model generated from the same model used on said first processing iteration.

In one embodiment, the computing error is detected during a result aggregation phase of the first processing iteration, and wherein at least a portion of the plurality of artificial intelligence processors wait for the first artificial intelligence processor to produce a valid result during the aggregation phase before completing the result aggregation phase.

In one embodiment, the first artificial intelligence processor sends an invalid result indicator to the at least a portion of the plurality of artificial intelligence processors to trigger the wait.

In one embodiment, the result aggregation phase is an All-Reduce.

In one embodiment, said loading the model comprises loading different portions of the model in the one or more of the artificial intelligence processors including the first artificial intelligence processor, the method further comprising processing a first portion of the data, received by the first artificial intelligence processor on the first processing iteration, in the one or more of the artificial intelligence processors including the first artificial intelligence processor.

In one embodiment, said loading the model comprises loading the model in the first artificial intelligence processor, the method further comprising processing a first portion of the data, received by the first artificial intelligence processor on the first processing iteration, in the first artificial intelligence processor.

In one embodiment, the model is received in the first artificial intelligence processor from a controller.

In one embodiment, the model is received in the first artificial intelligence processor from one or more other processors of the plurality of artificial intelligence processors.

In one embodiment, the model is received in the first artificial intelligence processor from a local memory of the first artificial intelligence processor.

In one embodiment, the model comprises artificial intelligence parameters.

In one embodiment, the model comprises neural network weights.

In one embodiment, the data set is a training data set.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An error recovery method comprising:
   detecting a computing error in a first artificial intelligence processor of a plurality of artificial intelligence processors during a first time period of a first processing iteration of data from a data set;
   eliminating the error from the first artificial intelligence processor; and
   loading, during a second time period of the first processing iteration, a model in the first artificial intelligence processor, wherein the model corresponds to a same model successfully processed at least in part during the first time period by a second artificial intelligence processor of the plurality of artificial intelligence processors.

2. The method of claim 1 wherein the plurality of artificial intelligence processors other than the first artificial intelligence processor wait while the first artificial intelligence processor eliminates the error, and wherein the plurality of artificial intelligence processors process data from the data set on a next processing iteration at the same time using a second same model generated from the same model used on said first processing iteration.

3. The method of claim 1 wherein the computing error is detected during a result aggregation phase of the first processing iteration, and wherein at least a portion of the plurality of artificial intelligence processors wait for the first artificial intelligence processor to produce a valid result during the result aggregation phase before completing the result aggregation phase.

4. The method of claim 3 wherein the first artificial intelligence processor sends an invalid result indicator to at least a portion of the plurality of artificial intelligence processors to trigger the wait.

5. The method of claim 3 wherein the result aggregation phase is an All-Reduce.

6. The method of claim 1 wherein said loading the model comprises loading different portions of the model in the one or more of the plurality of artificial intelligence processors including the first artificial intelligence processor, the method further comprising processing a first portion of the data, received by the first artificial intelligence processor on the first processing iteration, in the one or more of the plurality of artificial intelligence processors including the first artificial intelligence processor.

7. The method of claim 1 wherein said loading the model comprises loading the model in the first artificial intelligence processor, the method further comprising processing a first portion of the data, received by the first artificial intelligence processor on the first processing iteration, in the first artificial intelligence processor.

8. The method of claim 1 wherein the model is received in the first artificial intelligence processor from a controller.

9. The method of claim 1 wherein the model is received in the first artificial intelligence processor from one or more other processors of the plurality of artificial intelligence processors.

10. The method of claim 1 wherein the model is received in the first artificial intelligence processor from a local memory of the first artificial intelligence processor.

11. The method of claim 1 wherein the model comprises artificial intelligence parameters.

12. The method of claim 1 wherein the model comprises neural network weights.

13. The method of claim 1 wherein the data set is a training data set.

14. A non-transitory computer readable storage medium having stored thereon program code executable by a computer system, the program code causing the computer system to:
   detect a computing error in a first artificial intelligence processor of a plurality of artificial intelligence processors during a first time period of a first processing iteration of data from a data set;
   eliminate the error from the first artificial intelligence processor; and
   load, during a second time period of the first processing iteration, a model in one or more of the artificial intelligence processors including the first artificial intelligence processor, wherein the model corresponds to a same model successfully processed at least in part during the first time period by a second artificial intelligence processor of the plurality of artificial intelligence processors during the first processing iteration of the data from the data set.

15. The non-transitory computer readable storage medium of claim 14 wherein the plurality of artificial intelligence processors other than the first artificial intelligence processor wait while the first artificial intelligence processor eliminates the error, and wherein the plurality of artificial intelligence processors process data from the data set on a next processing iteration at the same time using a second same model generated from the same model used on said first processing iteration.

16. The non-transitory computer readable storage medium of claim 14 wherein the computing error is detected during a result aggregation phase of the first processing iteration, and wherein at least a portion of the plurality of artificial intelligence processors wait for the first artificial intelligence processor to produce a valid result during the result aggregation phase before completing the result aggregation phase.

17. The non-transitory computer readable storage medium of claim 16 wherein the first artificial intelligence processor sends an invalid result indicator to at least a portion of the plurality of artificial intelligence processors to trigger the wait.

18. A system comprising:

a plurality of artificial intelligence processors;

one or more controllers; and memory having stored thereon program code executable by the one or more controllers and the plurality of artificial intelligence processors, the program code causing the system to:

detect a computing error in a first artificial intelligence processor of a plurality of artificial intelligence processors during first time period of a first processing iteration of data from a data set;

eliminate the error from the first artificial intelligence processor; and load, during a second time period of the first processing iteration, a model in the first artificial intelligence processor, wherein the model corresponds to a same model successfully processed at least in part during the first time period by a second artificial intelligence processor of the plurality of artificial intelligence processors.

19. The system of claim 18 wherein the plurality of artificial intelligence processors other than the first artificial intelligence processor wait while the first artificial intelligence processor eliminates the error, and wherein the plurality of artificial intelligence processors process data from the data set on a next processing iteration at the same time using a second same model generated from the same model used on said first processing iteration.

20. The system of claim 18 wherein the computing error is detected during a result aggregation phase of the first processing iteration, and wherein at least a portion of the plurality of artificial intelligence processors wait for the first artificial intelligence processor to produce a valid result during the result aggregation phase before completing the result aggregation phase.

* * * * *